United States Patent [19]
Mir et al.

[11] 4,406,521
[45] Sep. 27, 1983

[54] LIGHT VALVE IMAGING APPARATUS HAVING IMPROVED ADDRESSING ELECTRODE STRUCTURE

[75] Inventors: José M. Mir, Rochester; Jerry R. Varner, Fairport, both of N.Y.

[73] Assignee: Eastman Kodak Company, Rochester, N.Y.

[21] Appl. No.: 230,099

[22] Filed: Jan. 29, 1981

[51] Int. Cl.³ .............................................. G02F 1/03
[52] U.S. Cl. ..................................... 350/392; 350/393
[58] Field of Search ........................ 350/384, 392–393, 350/356, 396, 336, DIG. 1; 358/213, 232, 241; 310/366, 368; 365/109, 117, 121; 174/68.5; 340/763, 765, 770, 775

[56] References Cited

U.S. PATENT DOCUMENTS

| | | | |
|---|---|---|---|
| 1,939,532 | 12/1933 | Zworykin | 350/392 |
| 3,696,479 | 10/1972 | Dias | 174/68.5 |
| 3,701,121 | 10/1972 | Fraser | 365/117 |
| 3,981,559 | 9/1976 | Channin | 350/336 |
| 4,222,638 | 9/1980 | Robert | 350/356 |
| 4,289,384 | 9/1981 | Samek | 350/392 |

OTHER PUBLICATIONS

Cutchen et al., PLZT Electrooptic Shutters; Applications App. Optics, 8-1975, pp. 1866–1873.
Gilmore, W. F., "Printed Circuit Generator", IBM Tech. Disc. Bull., 12-1969, p. 922.

Primary Examiner—William H. Punter
Attorney, Agent, or Firm—Raymond L. Owens

[57] ABSTRACT

An electro-optic modulator comprises a panel of electro-optic material containing a plurality of pixel regions which are activatable from an isotropic to birefringent state by application of an electric field, each pixel region including at least four linear electrodes extending transversely thereacross in a regularly spaced relation. In one preferred embodiment such electrodes have gaps therebetween in the range from about 50 microns to about 100 microns. In a related aspect the intra-pixel electrodes of each pixel region have a width in the range of from about 25 microns to 75 microns. In another aspect such electrodes can have one of several preferred structural configurations facilitating electrical addressing.

2 Claims, 12 Drawing Figures

LIGHT VALVE IMAGING APPARATUS HAVING IMPROVED ADDRESSING ELECTRODE STRUCTURE

CROSS-REFERENCE TO RELATED APPLICATIONS

Reference is made herein to U.S. patent application Ser. No. 230,089, now U.S. Pat. No. 4,367,946, entitled Light Valve Imaging Apparatus Having Improved Optical Configuration" and filed Jan. 29, 1981, in the name of J. R. Varner; U.S. patent application Ser. No. 230,096, now U.S. Pat. No. 4,366,499, entitled "Electronic Color Imaging Apparatus Having Improved Color Control Device", filed Jan. 29, 1981, in the name of J. M. Mir; U.S. patent application Ser. No. 230,092, now U.S. Pat. No. 4,378,568, entitled "Improved Light Valve Imaging Apparatus and Method for Providing Gray Scale", filed Jan. 29, 1981, in the name of J. M. Mir and U.S. patent application Ser. No. 230,095, now U.S. Pat. No. 4,371,892, entitled "Light Valve Imaging With Optimized Addressing Potential(s) to Reduce Inter-Pixel Nonuniformity", filed Jan. 29, 1987, in the name of J. M. Mir.

BACKGROUND OF THE INVENTION

1. Field of the Invention

The present invention relates to apparatus for forming an image (on a recording medium or for viewing) from an electrical signal and more particularly to improvements in electronic imaging apparatus and method of the kind using light valves.

2. Brief Description of the Prior Art

U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferro-electric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with the energization of red, green and blue exposing sources and according to the red, green and blue color information for the pixels of that image. One preferred embodiment disclosed in the above-mentioned patent comprises a linear array of separately-addressable, light valve elements that are disposed in spaced transverse relation to the path along which a photosensitive recording medium is fed. In this embodiment the pixels of the linear array are addressed concurrently, a line at a time, with image information and the movement of the recording medium along its feed path is synchronized with successive actuations of the linear array.

Light valve arrays of the type disclosed in the aforementioned patent use relatively high voltages to drive the light valves. This can present a difficulty where it is advantageous to use integrated circuits to address the light valves. Also, high voltages can, in some instances, cause sparking and breakdown of the field of the electrodes. In high resolution imaging applications it becomes desirable to have light valve arrays with a pixel density, i.e. wherein there are a large number of discretely-addressable light valve elements per unit of distance (e.g. 100–200 per inch). In operating in such high pixel density modes, it has been noted that a problem is presented in that the addressing electric field across one pixel of the light valve array can, in certain instances, affect its adjacent pixels.

More specifically, if the image signal addressed to adjacent pixels dictates that a first be "on" (i.e. modulating light) and the second be "off" (i.e. not modulating light), non-fidelity in image reproduction will occur if the discrete electric field is applied to one of those pixels to effect its proper addressed state, also affects the other pixel, which would be addressed to have no modulating field thereacross. Various techniques for providing physical barriers to electrically isolate pixels from the exterior fields of their neighbors are possible; however, these suffer the disadvantage of decreasing the light transmitting efficiency of the array or being difficult to fabricate. The straightforward approaches for minimizing cross-talk between pixels of the array are therefore contrary to the purpose of achieving inexpensive, high-resolution arrays with good light transmitting efficiency.

SUMMARY OF THE INVENTION

From a general viewpoint, it is an important feature of the present invention to provide apparatus having improved light valve array configurations for electronic imaging. In one aspect, it is an advantage of the present invention to provide electrode configurations which facilitate efficient operation at lower operating voltages. Another significant aspect of the present invention is the provision of improved structural configurations that reduce adverse inter-related electric field effects between adjacent pixels of light valve arrays in a novel and highly effective manner. Yet another important aspect of the present invention is to reduce inter-pixel cross-talk and facilitate lower operating voltages in a manner that is extremely advantageous from the viewpoint of light transmission efficiency. In another aspect, it is a significant advantage of the present invention to provide significantly decreased response time for such light valves. A further advantage of the present invention is the relative simplicity of fabrications which can implement its approach.

These advantages are achieved in accordance with one preferred embodiment of the present invention by providing an improved electro-optic modulator for such electronic light valve imaging apparatus. Such modulator comprises a panel of electro-optic material containing a plurality of pixel regions which are activatable from an isotropic to birefringent state by application of an electric field, each pixel region including at least four linear electrodes extending transversely thereacross in a regularly spaced relation. In one preferred embodiment such electrodes have gaps therebetween in the range from about 50 microns to about 100 microns.

In a related aspect the intra-pixel electrodes of each pixel region have a width in the range of from about 25 microns to 75 microns. In another aspect such electrodes can have one of several preferred structural configurations facilitating electrical addressing.

BRIEF DESCRIPTION OF THE DRAWINGS

The subsequent description of the preferred embodiments of the invention refers to the attached drawings wherein.

DETAILED DESCRIPTION OF THE PREFERRED EMBODIMENTS

Figure 1:
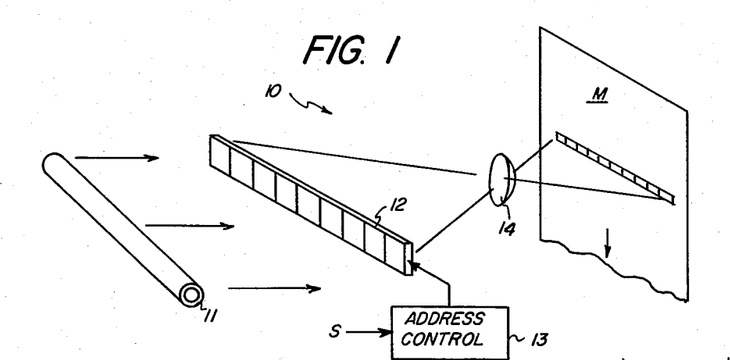
FIG. 1 is a perspective view schematically illustrating an exemplary apparatus of the type in which the present invention is useful.

FIG. 1 illustrates an electronic imaging apparatus 10 of the kind disclosed in U.S. Pat. No. 4,229,095 and of the kind in which the present invention can be advantageously utilized. Such apparatus comprises a radiation source 11 adapted to uniformly illuminate a light valve array 12, the pixels of which are selectively activated by address control means 13 so as to control the passage of light therethrough. It is desirable that the light illuminating array 12 be collimated and substantially normal to its ingress surface and U.S. patent application Ser. No. 230,089, entitled "Light Valve Imaging Apparatus Having Improved Optical Configuration" and filed Jan. 29, 1981, in the name of J. R. Varner discloses one preferred technique for accomplishing this and is incorporated herein by reference. Devices for supplying such illuminating radiation are disclosed in U.S. Pat. No. 4,229,095 and in U.S. patent application Ser. No. 230,096, entitled "Electronic Color Imaging Apparatus Having Improved Color Control Device", filed Jan. 29, 1981. in the name of J. M. Mir.

Lens means 14 images the strip array on a photosensitive recording medium M which is supported and moved through an exposure station in timed relation with the addressing of the light valve array so that lines of image information are successively recorded thereon. That is, an electrical signal S containing information representative of the image S to be recorded is applied to the address control which concurrently activates the pixels of the linear array 12 at least once each line according to the information content for the line to be recorded. U.S. patent application Ser. No. 230,092, entitled "Improved Light Valve Imaging Apparatus and Method for Providing Gray Scale", and filed Jan. 29, 1981, in the name of J. M. Mir discloses one preferred structural approach for implementing such addressing. The addressed pixels either pass or block light from source 11.

Figure 2:
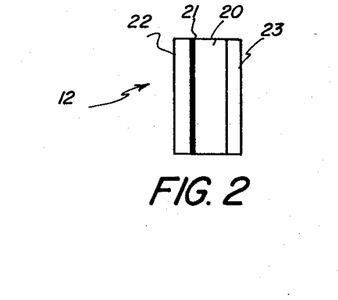
FIG. 2 is an enlarged side view of a light valve array such as shown in FIG. 1.

Referring to FIG. 2, one exemplary embodiment of such a light valve array can be seen. The array 12 can comprise a panel 20 of electro-optic material such as PLZT which transforms from an isotropic state to a polar or birefringent state in response to the application of an electrical field. For the purpose of applying such field, an electrode structure 21 is formed on one surface of the panel 20. Crossed polarizers 22 and 23 sandwich the panel 20; thus it is polarized light which passes from entrance polarizer 22 through the panel 20. In pixels having an applied electric field, the passing light is rotated approximately 90° and therefore passes exit polarizer 23 to expose the recording medium. In pixels not having an applied field, the electro-optic material is isotropic and light passes without a shift in polarization. Therefore, such light is blocked by exit polarizer 23 and does not expose the recording medium in an area aligned therewith.

Figure 3:
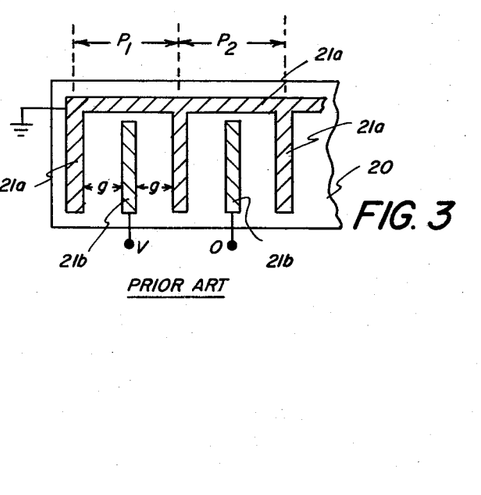
FIG. 3 is an enlarged plan view of a prior art electro-optic modulator such as has been used previously in light valve arrays.

One prior art electrode configuration for selectively applying appropriate activating electrical fields across pixels $P_1$, $P_2$ of the light modulator 21 can be seen in FIG. 3. In this configuration a reference electrode 21a comprises a plurality of bands extending from an upper edge of the electro-optic panel 20 transversely across the strip toward the lower edge in a regularly spaced relation and a band extending longitudinally along the top edge of the panel to connect the transverse bands. Separately energizable signal electrodes 21b are located respectively intermediate pairs of transverse electrode bands and the combination of a pair of transverse reference electrodes bands and an intermediate signal electrode form the means for energizing a given pixel $P_1$, $P_2$ . . . of the modulator 12. Thus, when the reference electrode 21a is coupled to a reference potential e.g. ground, the signal electrode can be energized or unenergized to address their respective pixels. As schematically illustrated in FIG. 3, the signal electrode of pixel $P_1$ has a voltage "V" applied while the signal electrode 21b of pixel $P_2$ is unenergized "O". An electric field will thus exist across the gaps "g" of pixel $P_1$ and not across those of pixel $P_2$. It will be understood that this is the condition which would exist for an image signal which required light for pixel $P_1$ and no light for pixel $P_2$. U.S. patent application Ser. No. 230,095, entitled "Light Valve Imaging with Optimized Addressing Potential(s) to Reduce Inter-Pixel Nonuniformity", and filed Jan. 29, 1981, in the name of J. M. Mir discloses preferred operating potential levels for such electric fields and is incorporated hereinby reference.

Figure 4:
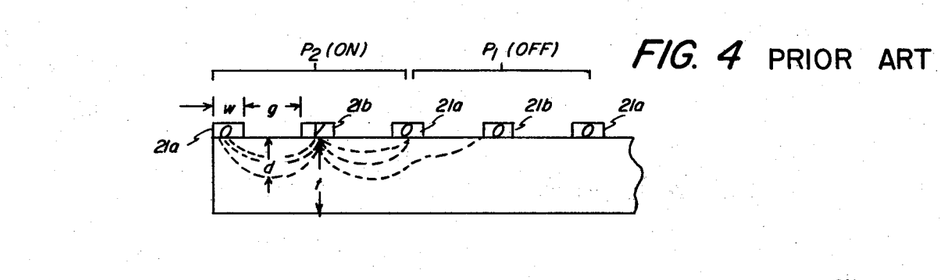
FIG. 4 is an enlarged sectional view of a portion of the modulator shown in FIG. 3.

The overall electro-optic effect of modulators such as 20 (i.e. their relative retardation "R" to light components parallel and perpendicular to the electric field), is directly proportional to the degree of birefringence "B" induced by the field and the distance over which such birefringence operates d, i.e. $R \propto B \cdot d$. FIG. 4 schematically illustrates the electric fields within the electro-optic material across gaps "g" between electrodes of the pixel $P_1$ of FIG. 3. The depth of penetration "d" of this field (indicated by dotted lines extending within the material from 21b to 21a) is directly proportional to the magnitude of the applied voltage V and the size of the gap "g" across which it is applied.

Considering the foregoing from the viewpoint of enhancing the electro-optic effect of the modulator, it is in one regard desirable to maximize the depth of field which can be achieved with high operative voltages and wide electrode gaps. We have found several problems to evolve from such modes of operation. First, high operating voltages can give rise to air breakdown and sparking of the electrodes. Second, integrated circuits are not, at present, readily fabricatable for use with high e.g. (200 V) voltages. Still further, we have found that increased depth of field creates another significant problem, viz., it increases cross-talk between adjacent pixels. This is shown schematically in FIG. 4 where it can be noted that the field from pixel $P_1$ is affecting the pixel $P_2$ zone. This tends to turn $P_2$ on when it should be off.

With the foregoing consideration in mind, we have found another electrode configuration to have significant advantages. Specifically, referring to FIGS. 5 and 6, it can be seen that the pixel elements of modulator 50 use a high-electrode-density, reduced-electrode-gap approach. We have found several advantages pertain to this approach. First, while maintaining a constant pixel spacing, the pixel cross-talk can be reduced since $d \propto g$ and g is greatly reduced. Second, lower operating voltages are possible. Consider, the birefringence B of the modulator is directly proportional to the square of the electrical field F across the electrodes, which can be represented with regard to applied voltage V and electrode gap g by the relation $F \propto V/g$ and therefore $B \propto (V/g)^2 \times d$. Thus, even though reducing the electrode gap decreases the depth of field d (recall $d \propto g$), the electro-optic effect R over the extent of field in which it does exist is enhanced when operating with reduced electrode gaps. We have found that in many applications, it is preferable to operate with reduced electrode spacings, and this approach of the present invention provides reduced cross-talk and allows lower operating voltages.

Figure 5:
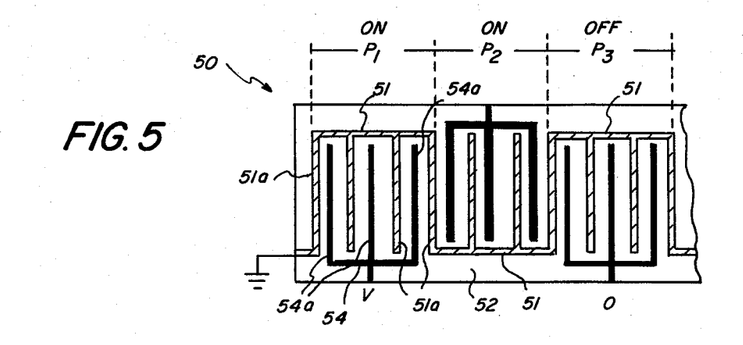
FIG. 5 is an enlarged plan view of one preferred embodiment of electro-optic modulator structure in accordance with the present invention.

Referring to FIG. 5, one preferred embodiment of electrode configuration in accord with the present invention is shown. This embodiment includes continuous reference electrode 51 for a plurality of pixels $P_1$, $P_2$ and $P_3$, in this instance connected to ground potential. As shown, the reference electrode forms a continuous line which winds between pixels in a serpentine fashion and also includes linear branches which form, with portions of the continuous line 51, a plurality of regularly spaced linear electrodes 51a extending transversely across the electro-optic panel 52. Each of the pixel portions of the panel 52 also includes a respective signal electrode 54 which has linear branches 54a that extend from a connecting line in regularly spaced interleaved relation with the portions 51a of reference electrode 51. Thus when an activating voltage V is applied to the signal electrode 54, electric fields are formed across the small gaps between adjacent electrode portions 51a and 54a.

Figure 6:
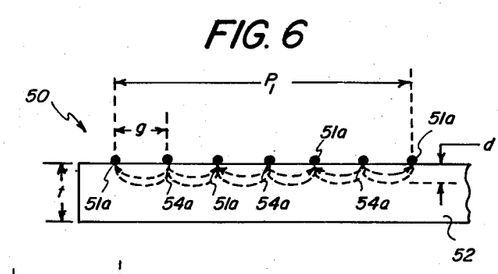
FIG. 6 is a cross-sectional view of a portion of the modulator shown in FIG. 5.

This can be seen in more detail in FIG. 6 which is an enlarged cross-sectional view of the pixel portion $P_1$ of panel 52. There it will be noted that the space "g" between electrodes and the resulting field depth "d" of modulator 50 are both considerably less than in the prior art approach illustrated by FIG. 4. Thus in the FIGS. 5 and 6 embodiment the field is applied across six inter-electrode gap portions of the panel rather than the two inter-electrode gap portions as in the FIG. 4 embodiment.

Thus, while the prior art has utilized one or two inter-electrode gap portions per pixel, it is the approach of the present invention to utilize three or more such gap portions per pixel. The useful and preferred number of activating electrodes (and thus inter-electrode gap portions) per pixel will depend on the particular imaging application involved and some general guidelines and specific useful and preferred parameters for designing light valves in accordance with the present invention will now be described.

First, considered from the viewpoint of electric-field-dependent response time of the electro-optic modulator, the gap "g" between electrodes (see FIG. 4) should be sufficiently small so that the desired electric field F will occur in the desired time period. For one preferred material, 9/65/35 PLZT, and for preferred light pulse times of in the range of about 1 to about 10 microseconds, gap size "g" is preferable such as to create an electric field of at least 20 K.V./cm. Thus for a particular operating voltage (e.g. the half-wave voltage for the particular light color being modulated), the gap "g" would be selected so that the relation:

$F = V/g \geq 20$ K.V./Cm would be satisfied.

Figure 11:
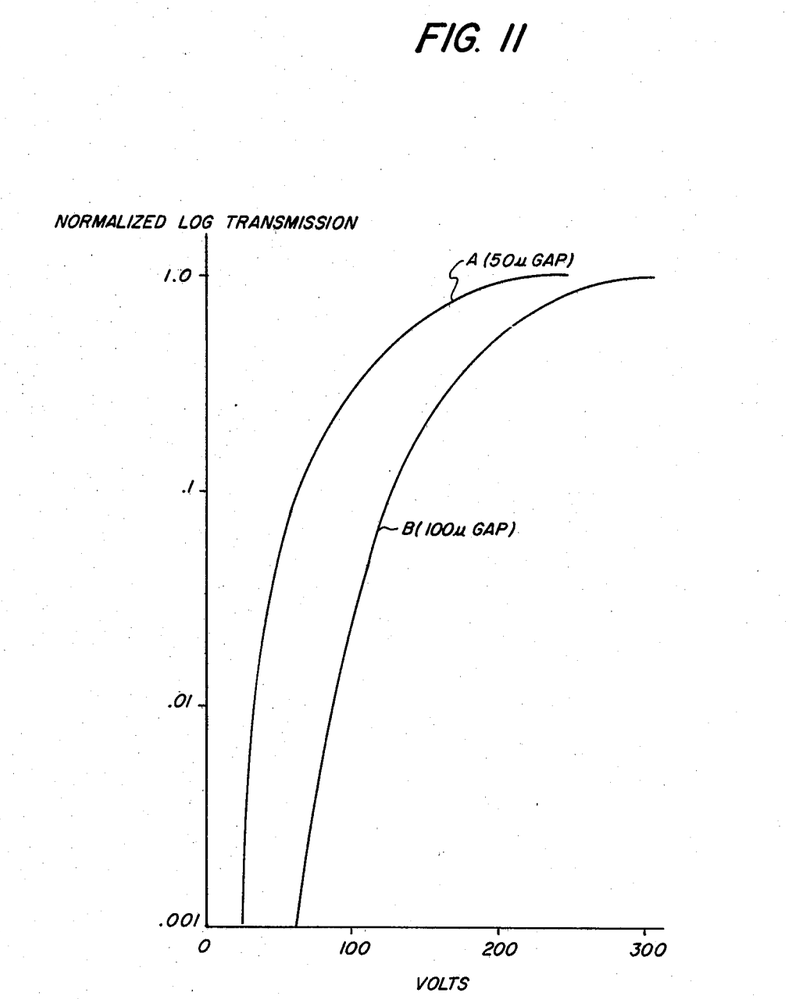
FIGS. 11 and 12 respectively indicate light transmission and response time variation with applied voltage for specific light valve structure according to the present invention.

Considered from the viewpoint of shorting due to air breakdown between adjacent electrodes, we have found that with electrode gaps "g" less than about 50μ, such breakdown occurs substantially before a half-wave activating voltage is reached. Thus, for applications aiming to maximize light transmission, it is preferred that the electrode gap "g" be about 50μ or greater so that activating voltage levels near the desirable half-wave voltage can be utilized. However, as described earlier, the smaller the electrode gap g, the more efficient (from the applied voltage viewpoint) is the electro-optic effect of the modulator. This is illustrated in FIG. 11 which is a plot of the normalized steady-state transmission for PLZT (9/65/35) light valves having electrode gaps "g" of 50μ (curve A) and 100μ (curve B) to light of 628 nm wavelength. It will be noted that the 100μ-gap light valve exhibits a half-wave voltage of about 300 V while the 50μ-gap light valve exhibits a half-wave voltage of about 250 V.

Thus taking both breakdown and electro-optic efficiency into consideration, we find it preferred, for most applications, to operate with electrode spacings in the range from about 50μ to about 100μ. Larger electrode spacings are operable in accordance with the present invention but require larger activating voltages to achieve a given electro-optic state, e.g. the half-wave voltage state.

Figure 12:
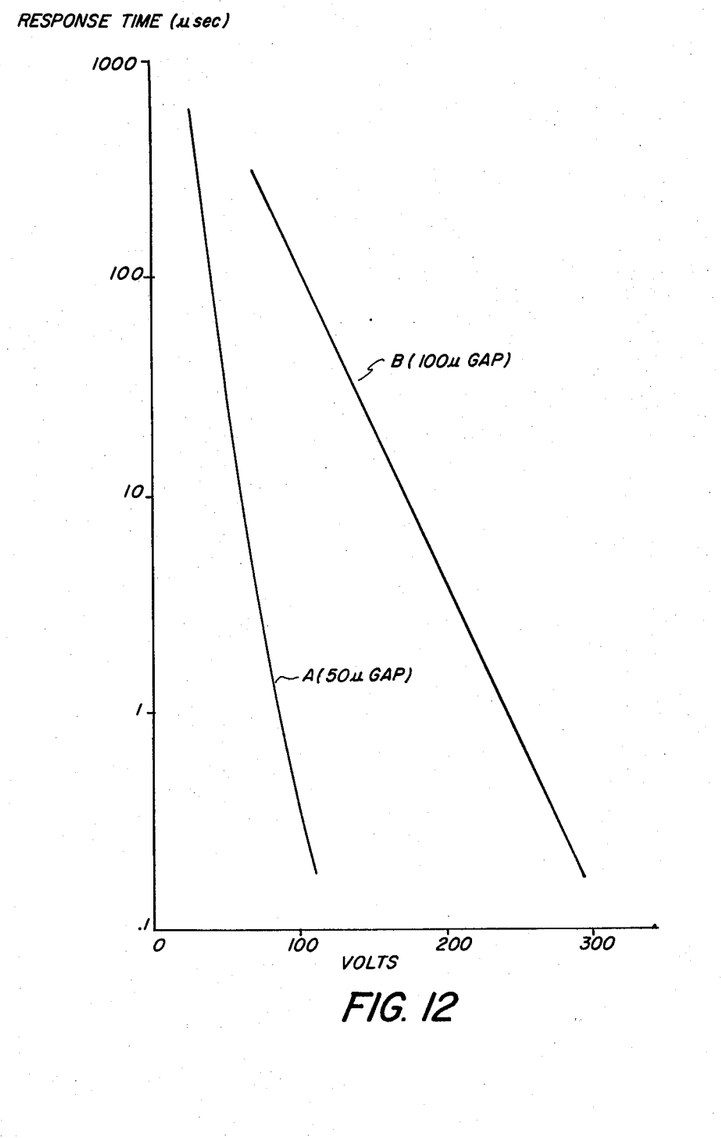

Referring now to FIG. 12, there can be noted one other remarkable aspect occuring with reduced electrode gaps in accordance with the present invention. The graph in FIG. 12 is a plot of response time to applied voltage for light valves having 50μ-gap (curve A) and 100μ-gap (curve B) electrode spacings. The light valves tested were formed of PLZT (9/65/35) and the response time points plotted represented the period required after a switch from non-energized to energized condition for the light valves' transmission of 628 nm wavelength light to reach approximately 63% of their maximum (i.e. steady-state) transmission. The significance of these curves can be appreciated by considering the different response time required for two light valve configurations if both were energized e.g. with 100 V potential. Thus the response time for the 50μ-gap light valve is approximately 0.5μ sec. compared to approximately 100μ sec for the 100μ-gap light valve. Considering this result it will be appreciated that for application where high response time is more important than maximized light transmission (e.g. high speed machines having a high intensity laser light source), electrode gaps of less than 50μ (e.g. as little as 25μ) can be advantageous. In such modes of operation the operating voltage levels are significantly less than the half-wave voltage, but the resultant loss of transmission efficiency provides extraordinary gain in response time.

The width "w" of the electrodes (see FIG. 4) is another parameter to be considered in light valve design. From the viewpoint of light transmission efficiency, it is desirable to have small electrode widths (i.e. to avoid as much as possible blocking light incident on the light valve). However, in prior art approaches, small-width electrodes (e.g. $w \geq g$) create cross-talk problems as described with respect to FIG. 4. Nevertheless, as the number of gaps "g" per pixel increases, the electrode size can be reduced with less cross-talk (i.e. $w < \lambda$). Therefore, in accord with the present invention, it is highly desirable to have extremely fine electrodes, e.g. as small as can be practically fabricated. In one alternative embodiment of the present invention subsequently described with respect to FIG. 9, the likelihood of inter-pixel cross-talk can be further minimized with fine electrodes by providing increased width boundary electrodes between pixels of the light valves. In connection with the electrode gap ranges described above, we have found electrode widths w in the range of from about 25μ to about 75μ to be preferred.

The overall modulator thickness "t" (see FIG. 4) from a theoretical viewpoint would be just sufficient to contain the full electric field depth "d". This would maximize light transmission, avoiding unnecessary light absorption or scattering. However, from the fabrication and sturdiness viewpoints, we have found thicker modulators, e.g. in the order of about 250–300μ to be preferable.

As mentioned above, the nominal activating voltage depends on the desired response time and the selected electrode spacing. We have found voltages in the range of from about 100 V to 200 V to be highly useful with electrode spacings of the order mentioned above. The teachings of the above-cited U.S. patent application Ser. No. 230,095, entitled "Light Valve Imaging with Optimized Addressing Potential(s) to Reduce Inter-Pixel Nonuniformity" should also be considered.

Electrodes can be formed on PLZT panels using standard photoresist technology. First, PLZT wafers are coated with evaporated metal layers (250 Å chrome and 8000 Å gold presently preferred). The wafers are then spin coated with a photoresist material (e.g. KODAK 809 positive resist for 30 seconds at 5000 rpm). The coated wafers are prebaked 30 minutes at 90° C. and then the desired electrode pattern is contact printed from a chrome mask using collimated light (about 20 mw/cm² at 10 seconds) from a high-pressure mercury arc light source. The photoresist image is developed in KODAK 809 developer solution, rinsed and post-baked (30 minutes at 90° C.). The metal layers are then etched:

Gold-1½ minutes with Aqua Regia
Chrome-1½ minutes with Ceric Ammonium Nitrate Solution The photoresist is now washed away by an acetone rinse followed by blowing the wafer dry with filtered nitrogen. Usually several light arrays are formed on each wafer; the wafer is easily diced into these units.

Figure 7:
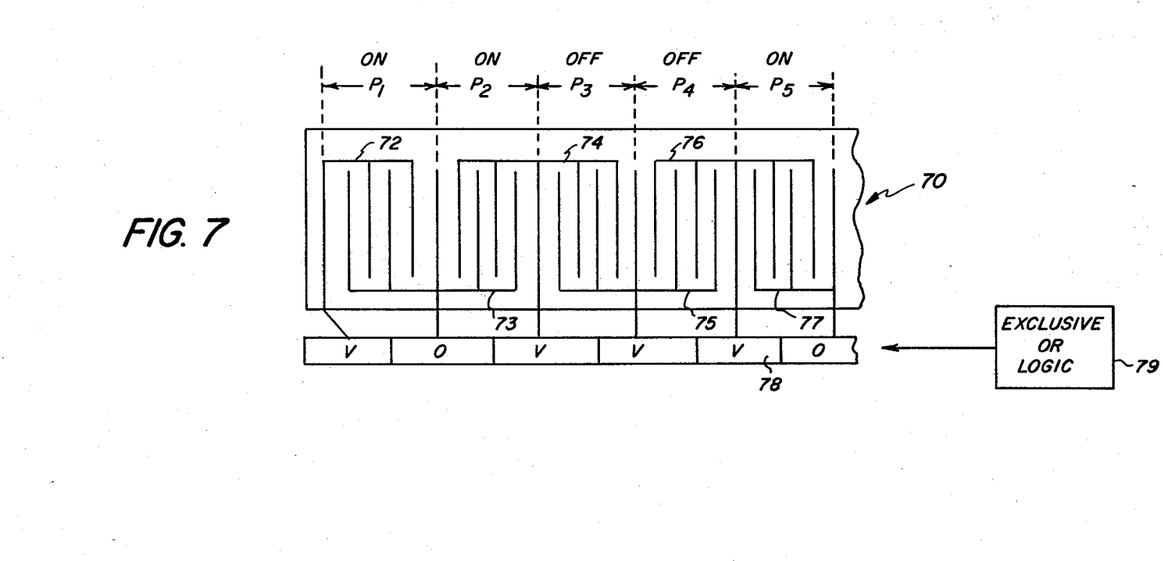
FIGS. 7-10 are plan views of other preferred modulator structures in accordance with the present invention.

Referring to FIG. 7, another preferred electrode configuration in accord with the present invention is illustrated. In this "shared-electrode" embodiment, the modulator 70 includes a plurality of separately-addressable electrode groups each coupled to addressing means, e.g. a serial-in parallel-out high voltage shift register 78. The successive electrode groups 72–77 each include a plurality of linear branches which are electrically coupled along one panel edge and extend in a regularly spaced relation across the panel 71. As shown in FIG. 7, the electrode groups have branch portions which are in interleaved relation with branch portions of the two adjacent electrode groups. Thus, when it is desired to activate pixels $P_1$–$P_5$ to selected off-on conditions the shift register can be addressed through appropriate logic circuitry, e.g. exclusive "or" logic 79 which could be built into the shift register or into the signal processor which addresses the shift register. An exemplary addressing for on-off conditions denoted above pixels $P_1$–$P_5$ is indicated by the "V" (voltage applied) and "0" (no voltage applied) bits in shift register 78. In this embodiment it will be noted that the field is applied across each pixel region by five inter-electrode gap portions.

Figure 8:
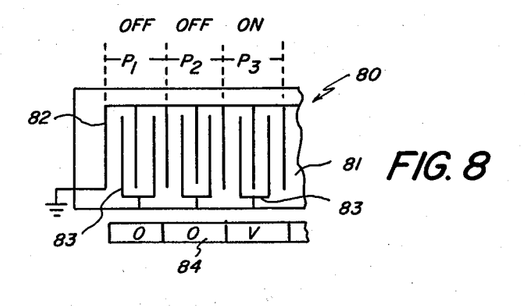

FIG. 8 discloses an embodiment according to the present invention that is similar to the FIG. 5 embodiment, but provides instead four inter-electrode gap portions per pixel and has the signal electrodes disposed for addressing along a one edge. Thus modulator 80 comprises panel 81, a grounded reference electrode structure 82 and a series of signal electrodes 83. A shift register 84 is shown with bits addressed "V" and "0" as they would be in order to create the OFF-ON condition indicated over pixels $P_1$–$P_3$.

Figure 9:
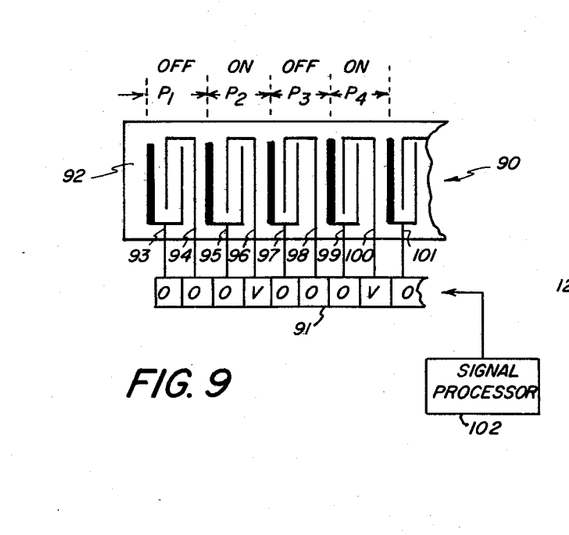

FIG. 9 discloses another embodiment of a shared electrode configuration which can be implemented with four inter-electrode gaps per pixel portion. Thus electrodes 93–101 on panel 92 are addressed by shift register 91 as indicated "V" or "0" in order to effect the indicated off-on condition for pixels $P_1$–$P_4$ of modulator 90. It is to be noted that signal processor 102 will be programmed to control the activation or non-activation of pixel boundary electrodes, 93, 95, 97, 99, 101 . . . , in accordance with the desired condition (OFF-ON) of the downstream pixel (in the direction of shift register input) and to control the activation of the interleaved electrodes 94, 96, 98, 100 . . . in accordance with the state of its respective boundary electrode and the desired ON-OFF condition for the pixel. It is also to be noted that this embodiment illustrates the concept of increasing the width of the pixel bounding electrode portions (as compared to the intra-pixel electrodes) to further reduce inter-pixel cross-talk.

Figure 10:
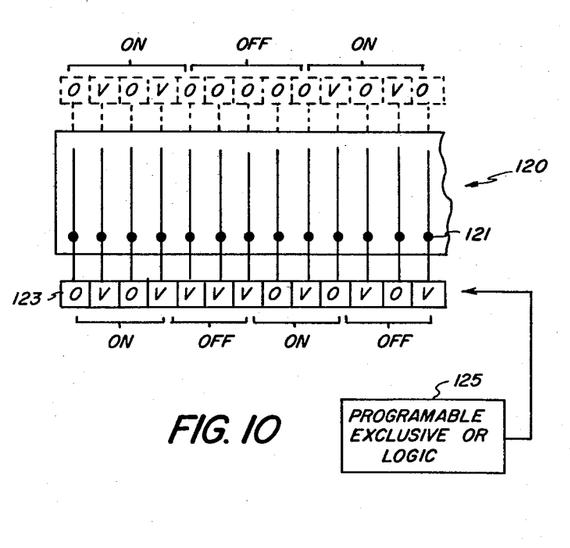

FIG. 10 discloses a shared electrode embodiment similar to FIGS. 7 and 9 but adapted for imaging with variable pixel size. Thus each linear electrode of the panel 121 of modulator 120 is coupled separately-addressable, e.g. coupled separately to a shift register 123 which is controlled by programmable exclusive "or" logic means 125. The bits of register 123 would be controlled to apply voltages "V" or "0" as indicated to energize modulator 120 to the off-on condition indicated with a three inter-electrode gap pixel. Above the modulator 120, another control mode of addressing register 123 is indicated in dotted lines as it can be effected to energize the four inter-electrode gap pixels to the conditions indicated thereabove.

The invention has been described in detail with particular reference to certain preferred embodiments thereof, but it will be understood that variations and modifications can be effected within the spirit and scope of the invention.

What is claimed is:

1. In electronic imaging apparatus of the type having: (1) a light valve array including: (a) an electro-optic modulator comprising a panel of electro-optic material which is activatable between birefringent and isotropic states in response to the application and removal of an electric field, (b) electrode means defining a plurality of discrete, separately-addressable pixel regions and adapted to selectively apply an electric field across such pixel regions and (c) first and second crossed polarizers sandwiching said modulator, (2) means for directing light through said array and (3) control means for addressing the electrodes of such pixel regions in accordance with an image to be reproduced, the improvement wherein each of said pixel regions comprises a plurality of linear electrodes extending in a regularly spaced relation transversely across said panel, in a manner defining at least three intra-region gaps respectively between pairs of said plurality of electrodes, and wherein the intra-pixel electrodes of each pixel region have a width in the range of from about 25 microns to about 75 microns and wherein the boundary electrodes between pixel regions have a width greater than the width of the intra-pixel electrodes.

2. An improved electro-optic array adapted for selectively modulating light passing discrete pixel regions therein, said array comprising:
   (a) a strip of electro-optic material of the type which transforms from an isotropic state to a birefringent state in response to the application of an electric field, said strip including a plurality of pixel regions aligned along its longitudinal dimension; and
   (b) a plurality of regularly-shaped, linear electrodes extending transversely across the pixel regions of said strip, each of said pixel region having at least three inter-electrode gap portions defined by said linear electrodes, the intra-pixel electrodes of each pixel region have a width in the range of from about 25 microns to about 75 microns and the boundary electrodes between pixel regions have a width greater than the width of the intrapixel electrodes.

* * * * *

UNITED STATES PATENT AND TRADEMARK OFFICE
CERTIFICATE OF CORRECTION

PATENT NO. : 4,406,521
DATED : September 27, 1983
INVENTOR(S) : Jose M. Mir and Jerry R. Varner It is certified that error appears in the above-identified patent and that said Letters Patent are hereby corrected as shown below:

Column 10, line 14, delete "regularly-shaped," and insert therefor --regularly-spaced,--.

Signed and Sealed this

Sixth Day of December 1983

[SEAL]

Attest:

GERALD J. MOSSINGHOFF

Attesting Officer  Commissioner of Patents and Trademarks